United States Patent [19]

Inokuchi

[11] Patent Number: 4,551,737

[45] Date of Patent: Nov. 5, 1985

[54] OPTICAL DATA PATTERN GENERATION DEVICE COMPRISING PHOSPHOR MEMBER

[75] Inventor: Toshiyuki Inokuchi, Yokohama, Japan

[73] Assignee: Ricoh Company, Ltd., Tokyo, Japan

[21] Appl. No.: 504,760

[22] Filed: Jun. 15, 1983

[30] Foreign Application Priority Data

Jun. 21, 1982 [JP] Japan .................................. 57-106595
Jun. 21, 1982 [JP] Japan .................................. 57-106596

[51] Int. Cl.⁴ ............................................ G01D 15/14
[52] U.S. Cl. .................................... 346/161; 313/422
[58] Field of Search ........... 346/158, 161, 110, 110 V, 346/155; 313/422

[56] References Cited

U.S. PATENT DOCUMENTS 4,227,117 10/1980 Watanabe et al. .............. 313/422 X

FOREIGN PATENT DOCUMENTS 3035988 4/1982 Fed. Rep. of Germany ...... 313/422

Primary Examiner—Thomas H. Tarcza
Attorney, Agent, or Firm—David G. Alexander

[57] ABSTRACT

An optical data pattern generation device scans an original document to generate an optical dot pattern corresponding to an image on the document. Optical dots are defined by portions at each of which an electrode array comprising minute electrodes and a minute phosphor member overlap each other. The individual electrodes are selectively energized to generate any desired optical dot pattern.

16 Claims, 18 Drawing Figures

OPTICAL DATA PATTERN GENERATION DEVICE COMPRISING PHOSPHOR MEMBER

BACKGROUND OF THE INVENTION

The present invention relates to a photoprinter for recording optical data patterns into a photoconductive element or like recording medium and, more particularly, to an optical data pattern generation device adapted for generating a desired optical data pattern to be projected on the recording medium and comprising a phosphor member.

In the field of printers, various types of photoprinters are known such as laser printers, optical fiber tube (OFT) printers, light emitting diode (LED) printers and optical shutter array printers. Of these known types of photoprinters, the laser printer requires such a movable mechanism as a high speed rotation mechanism as typified by a polygon, which adds to the intricacy of construction of an imaging system. The OFT printer suffers from a bulky construction and needs a strict control over the small gap between a recording surface and the adjacent end of a fiber tube. The LED printer employs numerous LED chips connected together in one direction or arranged in a zigzag configuration. This is undesirable because the LED chips contribute to an increase in cost and because the distribution of emitted light is uneven. Further, the optical shutter array printer has a drawback similar to that of the LED printer in case where use is made of PLZT or the like as a crystal device.

SUMMARY OF THE INVENTION

It is therefore an object of the present invention to provide a new photoprinter which eliminates the disadvantages inherent in the various prior art photo printers described.

It is another object of the present invention to provide an optical data pattern generation device comprising a phosphor member which allows a desired optical data pattern to issue effectively.

It is another object of the present invention to provide a generally improved optical data pattern generation device.

In one aspect of the present invention, there is provided an optical data pattern generation device which scans an image on an original document to generate an optical dot pattern corresponding to the image. At least one electrode array is included in the device which comprises a plurality of electrodes arranged in an array in a main scan direction. Each of the electrodes has a narrow width. A phosphor member extends in the main scan direction in the neighborhood of the electrode array and defines optical dots in portions thereof which overlap the electrode array. A cathode filament extends in the main scan direction. Drive means drives the individual electrodes in the array to cause the portions of the phosphor member overlapping the electrodes to emit light and thereby form a luminous dot pattern which corresponds to the image on the document.

In another aspect of the present invention, there is provided a device for recording an optical dot pattern which corresponds to an image on a document by scanning the image. The device includes a recording medium, imaging means for focusing the optical dot pattern onto the recording medium, and dot pattern generator means for generating the optical dot pattern which is fed to the imaging means. The dot pattern generator means comprises at least one electrode array having a plurality of electrodes arranged in an array in a main scan direction, each of the electrodes having a small width, a phosphor member extending in the main scan direction in the neighborhood of the electrode array, the phosphor member defining optical dots in portions thereof which overlap the electrode array, a cathode filament extending in the main scan direction, and drive means for driving the individual electrodes in the array to cause the overlapping portions of the phosphor member and the individual electrodes to emit light and thereby form a luminous dot pattern which corresponds to the image on the document.

The above and other objects, features and advantages of the present invention will become apparent from the following detailed description taken with the accompanying drawings.

DESCRIPTION OF THE PREFERRED EMBODIMENTS

While the optical pattern generation device of the present invention is susceptible of numerous physical embodiments, depending upon the environment and requirements of use, substantial numbers of the herein shown and described embodiments have been made, tested and used, and all have performed in an eminently satisfactory manner.

Figure 4:
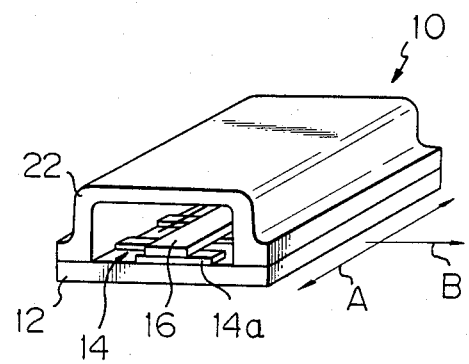
FIG. 4 is a perspective view of the device shown in FIG. 1.

Referring to FIGS. 1-4 of the drawings, an optical data pattern generation device embodying the present invention is shown and generally designated by the reference numeral 10. The device 10 includes a base glass 12 which carries thereon an array of transparent electrodes 14. A phosphor member 16, a grid electrode 18 and a cathode filament 20 are sequentially arranged to oppose a face glass 22 and hermetically confined in a bore defined by the base glass 12 and face glass 22. In FIG. 4, opposite ends of the bore are closed by side plates although not shown in the drawing.

Figure 1:
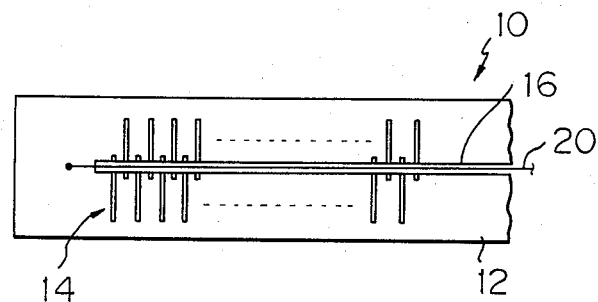
FIG. 1 is a schematic plan view of an overall arrangement of an optical data pattern generation device embodying the present invention.
Figure 2:
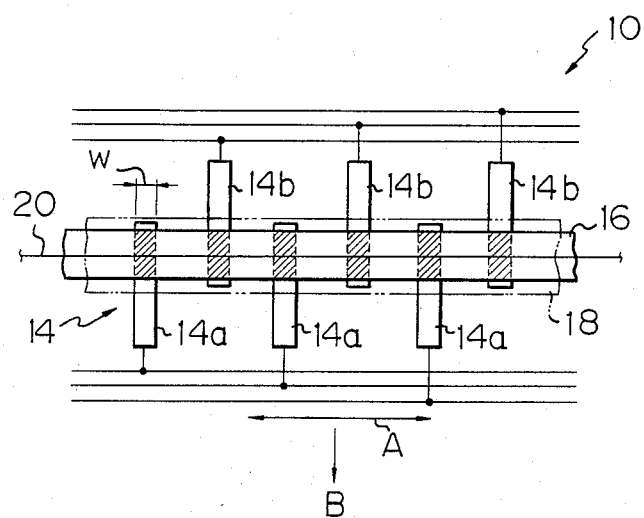
FIG. 2 is an enlarged plan view of the device shown in FIG. 1.
Figure 3:
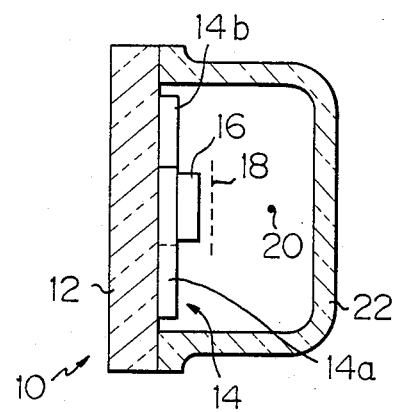
FIG. 3 is an enlarged sectional side elevation of the device shown in FIG. 1.

As shown in FIG. 2, the transparent electrode array 14 comprises a plurality of transparent electrodes 14a and a plurality of transparent electrodes 14b in the form of strips each having a very small width. The electrodes 14a and 14b alternate each other in a main scan direction A and are spaced apart by equal distances. The phosphor member 16 comprises an elongate very narrow strip which adjoins the transparent electrode array 14 and extends in the main scan direction A.

Figure 5:
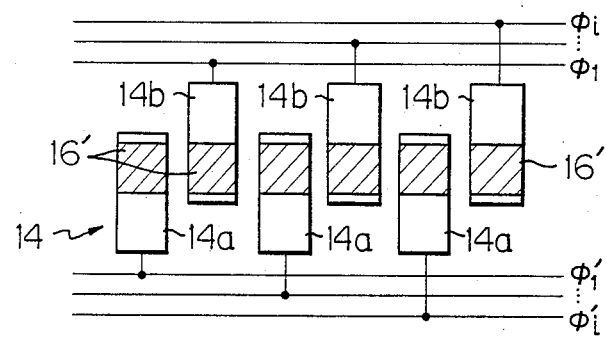
FIG. 5 is a plan view of a modification to the device shown in FIGS. 1-4.

Referring to FIG. 5, a modification to the optical data pattern generator of FIGS. 1-4 is illustrated. In this modification, the phosphor member comprises an array of minute blocks 16' which are arranged in an array in the main scan direction A. The shape of each block 16' may be square, for example. The phosphor blocks 16' are films individually formed on the transparent electrodes 14a and 14b to constitute dots which correspond to a luminous dot pattern, which will be described. The width of the phosphor blocks 16' is common to the width of the electrodes 14a and 14b on which they are carried. To produce such phosphor blocks 16', photolithography and etching may be employed which are the application of IC patterning techniques. Whereas the phosphor blocks 16' in the modification will emit light individually as indicated by hatching in the drawing, the phosphor strip 16 shown in FIG. 2 will emit light in each of the narrow areas where, as indicated by hatching the narrow transparent electrodes 14a and 14b overlap the strip 16 which also has a small width (in a direction B perpendicular to the direction A).

Figure 6:
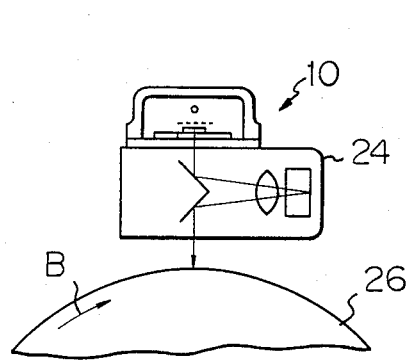
FIGS. 6 and 7 are views showing any of the devices of FIGS. 1-5 which is applied to a recording apparatus comprising an imaging device and a recording medium.
Figure 7:
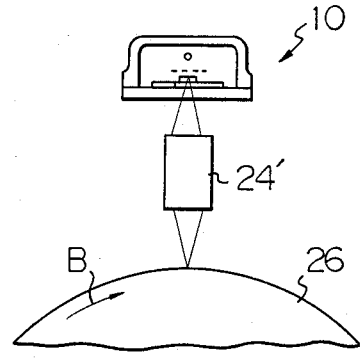

In the device 10 of the first embodiment, a luminous dot pattern created by the phosphor member 16 or 16' may be projected through the base glass 12. Therefore, it is possible to write any desired optical data pattern into a photoconductive element 26, or recording medium, as shown in FIG. 6 or 7 through a suitable imaging element, which comprises a dach mirror lens array 24 in FIG. 6 and a bar lens array or optical fiber array 24'. Here, the photoconductive element 26 will move in a direction B which is a subscan direction perpendicular to the main scan direction A in FIG. 4. In case where a dach mirror lens array is used as the imaging element, an advantage is attained in that the wide spectrum range of the phosphor is usable as it is, by virtue of the chromatic aberration of such a lens array which is smaller than that of the bar lens array. Another advantage achievable with the dach mirror lens array is that due to its inherent depth of a focus the positioning tolerance on the projection surface of the recording medium is increased to produce favorable images. The imaging element shown and described may be replaced by a Porro prism lens array which is disclosed in Japanese patent application No 184845/1981.

Figure 8:
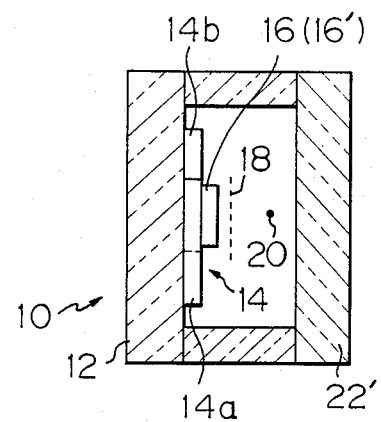
FIG. 8 is a sectional side elevation of another modification to the devices of FIGS. 1-5.
Figure 9:
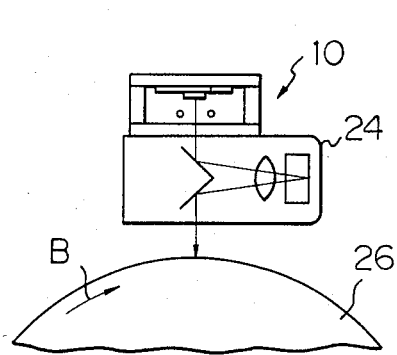
FIGS. 9 and 10 are views of the device shown in FIG. 8 which is applied to a recording apparatus comprising an imaging device and a recording medium.
Figure 10:
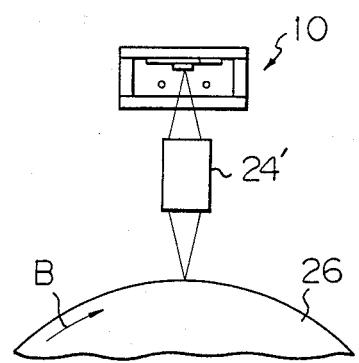
Figure 11:
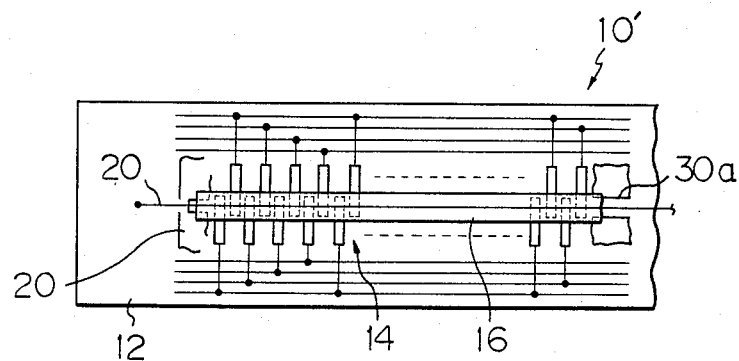
FIG. 11 is a schematic plan view of another embodiment of the present invention.

Another modification to the pattern generator 10 of the present invention is shown in FIG. 8. In this particular modification, a face glass 22' is made of transparent glass and positioned parallel to the base glass 12. Therefore, a luminous dot pattern formed by the phosphor member 16 or 16' is allowed to project itself from the face glass 22' via the grid electrode 18 and cathode filament 20. As described with reference to FIG. 6 or 7, the luminous dot pattern output through the face glass focused onto the photoconductive element 26 by an imaging element which may be a dach mirror lens array 24 as shown in FIG. 9 or a bar lens array 24' shown in FIG. 10. Due to the projection of a dot pattern through the face glass 22', ordinary opaque metal electrodes may be used in place of the transparent electrodes 14a and 14b of the first embodiment. Naturally, where transparent electrodes are employed as in the first embodiment, a dot pattern may be projected from both sides of the assembly, i.e., through both the base glass 12 and face glass 22'.

The first embodiment of the present invention and modifications thereto shown in FIGS. 1-10 feature various advantages as enumerated below.

(1) In the construction shown in FIG. 5, each phosphor block 16' itself has a luminous dot size so that the pattern of one dot can be limited favorably to a desired configuration. This will cause a minimum of crosstalk between adjacent phosphor blocks 16' and, therefore, make it unnecessary to design the width of each electrode 14a or 14b very small relative to the pitch of arrangement thereof.

(2) The construction shown in FIG. 2 permits the narrow and elongate phosphor strip 16 itself to limit the luminous dot width in the direction B which is perpendicular to the main scan direction A, thereby facilitating production of the dot pattern.

(3) Where the electrodes 14a and 14b comprise transparent electrodes, a luminous dot pattern can be picked up through the base glass 12. This will lead the beams to the outside without causing them to be vignetted or fluctuated by the cathode filament 20, grid electrode 18 or face glass 22.

(4) In the construction of FIG. 8 which projects a luminous dot pattern through the face glass 22', the beams issuing from the surface of the phosphor member 16 or 16', on which electrons impinge, are directly utilized to farther increase the light utilizing efficiency.

(5) The phosphor member 16 or 16' is available today in a wide variety of choices with respect to the spectral energy characteristic. The phosphor member, therefore, can be readily matched to a specific spectral sensitivity of the recording medium 26.

Referring to FIGS. 11-14, a second embodiment of the present invention is shown in which the structural elements common to those of the first embodiment are designated by the same reference numerals. As shown, the optical data pattern generator, generally 10', includes a light intercepting member 30 which is carried on the base glass 12. A transparent electrode array 14, a phosphor member 16, a grid electrode 18 and a cathode filament 20 are confined in a sealed bore defined between the base glass 12 and the face glass 22, to face the face glass in this order. Opposite ends of the bore are closed by side plates, not shown, as has been the case with the first embodiment.

Figure 12:
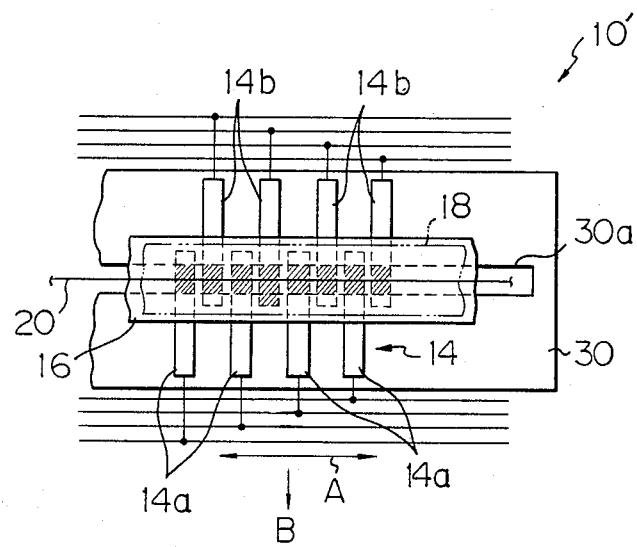
FIG. 12 is an enlarged plan view of the device shown in FIG. 11.
Figure 13:
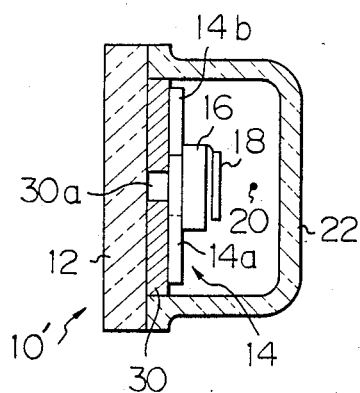
FIG. 13 is a sectional side elevation showing the device of FIG. 11 in enlarged scale.
Figure 14:
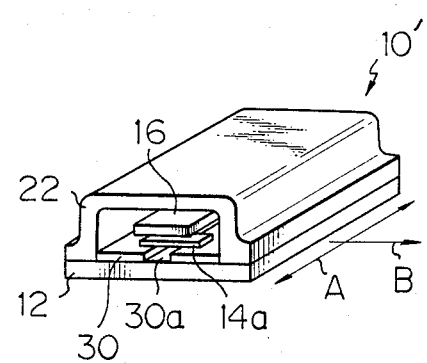
FIG. 14 is a perspective view of the device shown in FIG. 11.

The light interceptor 30 comprises a thin layer deposited on the base glass 12 and is formed with a slot 30a which is as narrow as about 100 microns, for example. As shown in FIG. 12, the slot 30a extends in parallel to the main scan direction A. If desired, the elongate slot 30a may be replaced by a plurality of minute block-shaped apertures 30a' which are arranged in an array along the main scan direction A. Again, the transparent electrode strips 14a and 14b alternate each other along the main scan direction A. The apertures 30a intersect the transparent electrodes 14a and 14b perpendicular thereto and are individually arranged in widthwise alignment with the transparent electrodes 14a or 14b. The phosphor member 16 comprises a strip extending in the main scan direction A and having a width larger than that of the phosphor member of the first embodiment. Located adjacent to the transparent electrode array 14, the phosphor member 16 in this particular embodiment may be applied to the transparent electrode array 14 as by printing. This phosphor layer is isolated from the outside by the face glass 22.

Figure 15:
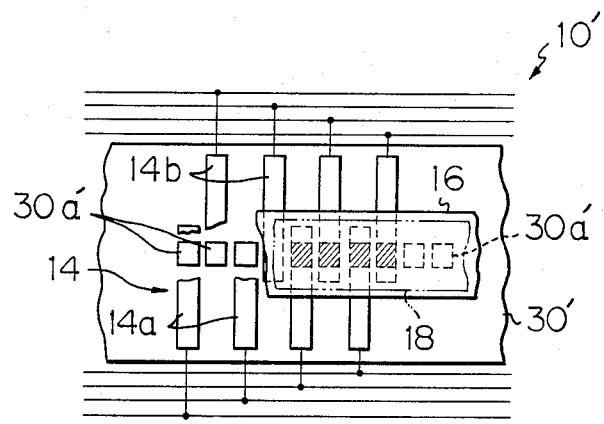
FIG. 15 is a plan view of a modification to the device shown in FIGS. 11-14.
Figure 16:
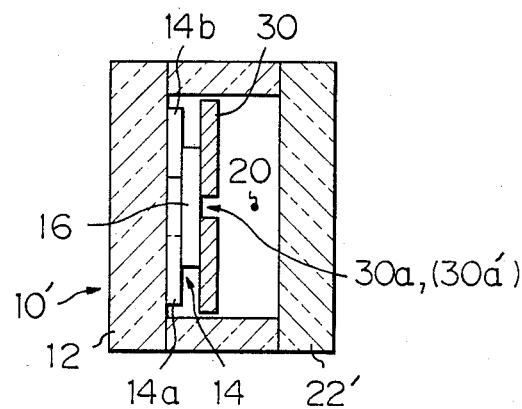
FIG. 16 is a sectional side elevation of another modification to the devices shown in FIGS. 11-15.

The light interceptor 30 and the opening 30a or openings 30a' will provide a number of minute light dots, such as one indicated by hatching in FIG. 12 or 15, when the phosphor member 16 is caused to emit light, the light dots forming a row along the main scan direction A. As in the first embodiment shown in FIG. 6 or 7 the imaging element 24 or 24' may be used to focus the dot pattern output through the base glass 12 onto the recording medium 26. Alternatively, as shown in FIG. 16, the face glass 22' may be made of transparent glass to project a luminous dot pattern therethrough as in the modification of FIG. 8, the output dot pattern being focused by the imaging device 24 or 24' onto the recording medium 26.

The data pattern generator 10 described above with reference to FIGS. 11–16 achieves the following outstanding advantages in addition to the advantages (3) to (5) previously described.

(1) In the construction of FIG. 12, the emitted dot size is determined by each electrode and the slot 30a so that the phosphor member 16 is attainable merely by continously printing a slot with the resultant ease of manufacture of the scanner element.

(2) The construction of FIG. 5 having minute apertures 30a' formed through the light interceptor is capable of limiting the luminous dot configuration as desired, thereby additionally reducing the crosstalk.

Figure 17:
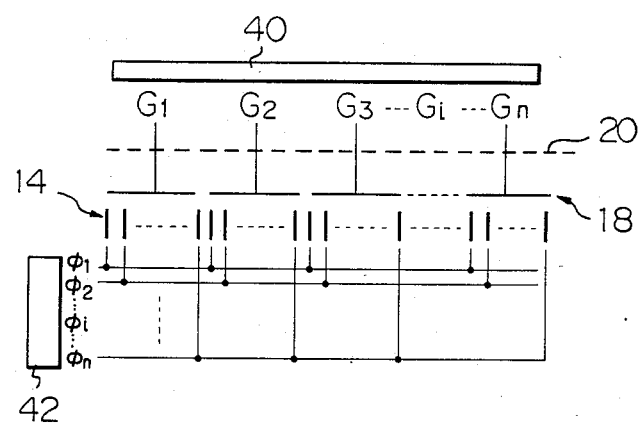
FIG. 17 is a diagram showing an example of a drive circuit which is included in each of the embodiments in order to control emission of light from a phosphor member.

Referring to FIG. 17, there is shown an example of a driver circuit for controlling the emission of light from an optical data pattern generator in accordance with any one of the foregoing embodiments and their modifications. As shown, the grid electrode 18 is divided into a plurality of grid sections. Drivers 40 and 42 are associated respectively with the divided grid electrode 18 and the transparent electrode array 14 which correspond to the individual optical dots. In this construction, voltages impressed on the divided grid electrode 18 and transparent electrode array 14 are individually controlled by the drivers 40 and 42, thereby sequentially emitting an optical pattern from a grid section at a time. Supposing that it is desired to cause the "i" dot to glow out of Gn regions, a positive potential will be applied to each of Gi and φi. In this manner, the drive circuit is constructed to control light emission by the combination of dynamic pulses at the grid sections and the drive of the individual electrodes.

Figure 18:
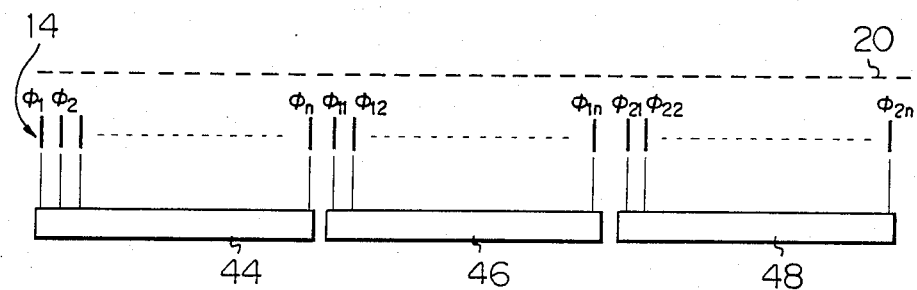
FIG. 18 is a diagram showing a modification to the drive circuit of FIG. 17.

Another example of the driver circuit is shown in FIG. 18. In this case, a voltage is applied directly across the cathode filament 20 and the transparent electrode array 14, which serves as an anode, without the intermediary of the grid electrode. All the transparent electrodes 14a and 14b may be supplied with a voltage individually or may be divided into blocks, as indicated in the drawing, in which case a plurality of driver circuits 44, 46 and 48 will be associated each with one of the electrode blocks.

Such a driver circuit for controlling emission of light will cause information light to issue, that is, cause the phosphor member 16 to emit light in the following manner. Electrons issuing from the cathode filament 20 are usually directed toward the grid electrode 18 or the electrodes 14a and 14b of the array 14 which are usually negative in polarity, while being prevented from reaching the phosphor member 16 disposed between the grid electrode 18 and the transparent electrodes 14a and 14b. However, when a predetermined potential is applied by the driver circuit of the type described to an electrode 14a or 14b which corresponds to a specific dot, the electrons from the cathode filament 20 fly toward the transparent electrode 14a or 14b so that a minute area of the phosphor member 16 which stands in the path of the flight is energized to glow. In this instance, if the phosphor members 16' are constituted by a dot pattern itself as indicated by hatching in FIG. 5 or 15, the pattern will appear clear cut without running to the periphery (without being outfocused) while, at the same time, crosstalk with the adjacent dots is minimized to give the pattern a high contrast.

Meanwhile, the phosphor member 16 shown in FIG. 2 needs only be adhered to the electrode array 14 over its narrow continuous strip-like area, rendering the manufacture quite easy. It is a requisite here that the width w of each electrode 14 in FIG. 2 be designed smaller than the pitch between adjacent dots to a certain degree in order to reduce the running (outfocusing) of the optical dots in the main scan direction A. For example, each electrode 14 may be dimensioned about 40 micron wide for a dot size of 100 microns. This will insure a high contrast for the luminous dot pattern.

Where one line of scan or light emission is performed by the sectional drives as shown in FIG. 17 or 18, the emission time per dot may be one multiplied by the number of sections which will accordingly reduce the load concerning the luminous intensity. On the other hand, where the emission of light continues over a predetermined time (pulse duration) on a block-by-block basis, the one line scanning time is one divided by the number of the sections whereby the recording operation is sped up. This achieves a high speed recording function which is far out of the reach of a CRT line recording system, which performs raster scanning.

In summary, it will be seen that the present invention provides an optical data pattern generation device which is very small-sized, incostly and saves power consumption by virtue of the use of a phosphor member which is economical, compact, integral and furnished with a self-glowing function. Additionally, the contrast of a luminous pattern achievable with such a device is remarkable.

Various modifications will become possible for those skilled in the art after receiving the teachings of the present disclosure without departing from the scope thereof. For example, the imaging element and recording medium shown and described are not limitative and may be replaced by others insofar as they have similar functions. The device of the present invention may be moved relative to the recording medium, as opposed by the construction shown and described. Furthermore, the device of the present invention is applicable to a display tube type system as well.

What is claimed is:

1. An optical data pattern generation device for generating an optical dot pattern, said apparatus comprising:

at least one electrode array comprising a plurality of electrodes arranged in an array in a main scan direction, each of said electrodes having a narrow width;

a phosphor member extending in the main scan direction in the neighborhood of the electrode array, said phosphor member defining optical dots in portions thereof which overlap the electrode array;

a cathode filament extending in the main scan direction; and drive means for driving the individual electrodes of the electrode array to cause the portions of the phosphor member overlapping the electrodes to emit light and thereby form a luminous dot pattern.

2. A device as claimed in claim 1, in which each of the electrodes in the electrode array is made of a transparent material.

3. A device as claimed in claim 2, further comprising a transparent base glass for accommodating the electrode array, the phosphor member and the cathode filament, and a face glass covering said base glass, the luminous dot pattern being projected through the base glass.

4. A device as claimed in claim 1, in which each of the electrodes in the array is made of opaque metal.

5. A device as claimed in claim 4, further comprising a base glass for accommodating the electrode array, the phosphor member and the cathode filament, and a transparent face glass for covering the base glass, the luminous dot pattern being projected through said face glass.

6. A device as claimed in claim 3, in which the face glass is made of a transparent material, the luminous dot pattern being projected through both the transparent base glass and the transparent face glass.

7. A device as claimed in claim 1, in which the phosphor member comprises a strip which extends in the main scan direction and has a narrow width.

8. A device as claimed in claim 1, in which the phosphor member comprises a plurality of minute phosphor blocks corresponding to the individual optical dots and arranged in an array along the main scan direction.

9. A device as claimed in claim 1, further comprising a light intercepting member having means for forming optical dots of any configuration, said means overlapping said portions where the phosphor member and the electrode array overlap each other.

10. A device as claimed in claim 9, in which the optical dot forming means comprises a single straight slot which intersects each of the electrodes in the array perpendicular thereto.

11. A device as claimed in claim 9, in which the optical dot forming means comprises a plurality of minute apertures which are formed in an array in the main scan direction in correspondence with the optical dots of any configuration.

12. A device for recording an optical dot pattern, comprising:

a recording medium;

imaging means for focussing the optical dot pattern onto the recording medium; and dot pattern generator means for generating the optical dot pattern which is fed to said imaging means;

said dot pattern generator means comprising at least one electrode array having a plurality of electrodes arranged in an array in a main scan direction, each of said electrodes having a small width, a phosphor member extending in the main scan direction in the neighborhood of the electrode array, said phosphor member defining optical dots in portions thereof which overlap the electrode array, a cathode filament extending in the main scan direction, and drive means for driving the individual electrodes in the array to cause the overlapping portions of the phosphor member and the individual electrodes to emit light and thereby form a luminous dot pattern.

13. A device as claimed in claim 12, further comprising a light intercepting member for forming optical dots of any shape by overlapping the individual portions where the phosphor member and the electrode array overlap each other.

14. A device as claimed in claim 12, in which the imaging means comprises a dach mirror lens array.

15. A device as claimed in claim 12, in which the imaging means comprises a Porro prism array.

16. A device as claimed in claim 12, in which the imaging means comprises a bar lens array.

* * * * *